United States Patent
Kuehnle et al.

(10) Patent No.: US 9,860,445 B2
(45) Date of Patent: Jan. 2, 2018

(54) DUAL NODE COMPOSITE IMAGE SYSTEM ARCHITECTURE

(71) Applicant: Bendix Commercial Vehicle Systems LLC, Elyria, OH (US)

(72) Inventors: Andreas U. Kuehnle, Villa Park, CA (US); Marton Gyori, Budapest (HU); Hans M. Molin, Mission Viejo, CA (US); Karl H. Jones, Fullerton, CA (US); Travis G. Ramler, Tusitin, CA (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 234 days.

(21) Appl. No.: 14/739,302

(22) Filed: Jun. 15, 2015

(65) Prior Publication Data

US 2016/0366336 A1    Dec. 15, 2016

(51) Int. Cl.
  *B60R 1/00*      (2006.01)
  *G06K 9/00*     (2006.01)
  *H04N 5/232*    (2006.01)
  *H04N 7/18*     (2006.01)

(52) U.S. Cl.
  CPC ......... *H04N 5/23238* (2013.01); *B60R 1/002* (2013.01); *G06K 9/00791* (2013.01); *H04N 7/181* (2013.01)

(58) Field of Classification Search
  CPC .................................................. H04N 5/23238
  USPC ........................................................ 348/148
  See application file for complete search history.

(56) References Cited

U.S. PATENT DOCUMENTS

| | | | |
|---|---|---|---|
| 6,690,413 B1 * | 2/2004 | Moore | B60R 1/00 348/148 |
| 7,974,444 B2 | 7/2011 | Hongo | |
| 8,902,313 B2 | 12/2014 | Rottner et al. | |
| 9,129,528 B2 * | 9/2015 | Lavoie | G08G 1/0962 |
| 9,156,496 B2 * | 10/2015 | Greenwood | B60R 1/00 |
| 9,457,970 B1 * | 10/2016 | Zevenbergen | B65G 67/02 |

(Continued)

FOREIGN PATENT DOCUMENTS

| | | |
|---|---|---|
| EP | 2 746 078 A1 | 6/2014 |
| JP | 2003-235036 A | 8/2003 |

(Continued)

OTHER PUBLICATIONS

International Search Report and Written Opinion of corresponding International Application No. PCT/US2016/036794 dated Aug. 24, 2016.

Primary Examiner — Mohammed Rahaman
Assistant Examiner — Asmamaw G Tarko
(74) Attorney, Agent, or Firm — Fay Sharpe LLP

(57) ABSTRACT

When employing a multi-node computing architecture for commercial articulated vehicles to generate a composite surround view of the vehicle, each processing node is associated with a vehicle segment. Each node has its own processor, memory and sensors. A master-slave relationship exists in the architecture. The segment processors collect, format, manage and package their local information. Communication between nodes is controlled by the master node, which can limit, adjust, subsample and alter the information and information flow from the slave nodes. The slave nodes can be freely recombined, using a pre-established communication standard or a format agreed upon at combination time.

23 Claims, 5 Drawing Sheets

(56) References Cited

U.S. PATENT DOCUMENTS

| | | |
|---|---|---|
| 2010/0171828 A1 | 7/2010 | Ishii |
| 2011/0071801 A1* | 3/2011 | Carrasco ............. G06F 17/5004 703/1 |
| 2013/0156113 A1* | 6/2013 | Ismael-Mia ...... H04N 19/00927 375/240.25 |
| 2014/0267688 A1* | 9/2014 | Aich ...................... H04N 7/181 348/113 |
| 2014/0293052 A1 | 10/2014 | Kuehnle et al. |
| 2014/0309887 A1* | 10/2014 | Lavoie .................. B62D 13/06 701/41 |

FOREIGN PATENT DOCUMENTS

| | | | |
|---|---|---|---|
| JP | 2003235036 A | * | 8/2003 |
| WO | 2014/073756 A1 | | 5/2014 |

* cited by examiner

DUAL NODE COMPOSITE IMAGE SYSTEM ARCHITECTURE

BACKGROUND

The present application finds particular application in surround-view vehicle imaging systems. However, it will be appreciated that the described techniques may also find application in other vehicle monitoring systems, other imaging systems, or other vehicle safety systems.

Conventional surveillance systems for trucks do not provide a system architecture for image processing between interchangeable vehicle sections, with possibly varying numbers of cameras and calibrations. Without knowledge of the number of cameras and their calibration, and without sufficient electronic control unit (ECU) capacity to process the incoming camera images, a surround view of the entire vehicle cannot be generated.

The present innovation provides new and improved systems and methods that facilitate generating a surround view image for an articulated commercial vehicle with interchangeable vehicle segments, which overcome the above-referenced problems and others.

SUMMARY

In accordance with one aspect, a system that facilitates generating a composite surround view image using a multi-node computer architecture for an articulated commercial vehicle comprises a first set of one or more cameras that capture images of an area surrounding a first portion of the articulated vehicle, and a first processing node that receives captured image data from the first set of one or more cameras. The system further comprises a second set of one or more cameras that capture images of an area surrounding a second portion of the articulated vehicle, and a second processing node that receives captured image data from the second set of one or more cameras and forwards the captured image data to the first processing node. The first processing node is configured to generate a composite surround view image of the articulated vehicle from the captured image data received from the first and second sets of one or more cameras.

In accordance with another aspect, an electronic controller unit (ECU) that facilitates generating a composite surround view image using a multi-node computer architecture for an articulated commercial vehicle comprises a processor configured to receive from a first set of one or more cameras captured video data of an area surrounding a first portion of the articulated vehicle, receive from a secondary ECU video data captured by a second set of one or more cameras of an area surrounding a second portion of the articulated vehicle, and determine an angle of articulation between the first and second portions of the articulated vehicle. The processor is further configured, for each video frame, to stitch together a composite surround view image of the articulated vehicle from the captured image data received from the first and second sets of one or more cameras while compensating for the determined articulation angle.

In accordance with another aspect, a method of generating a composite surround view image using a multi-node computer architecture for an articulated commercial vehicle comprises receiving at a first processing node captured image data of an area surrounding a first portion of the articulated vehicle from a first set of one or more cameras, receiving at a second processing node captured image data of an area surrounding a second portion of the articulated vehicle from a second set of one or more cameras, and receiving at the first processing node the captured image data of the area surrounding the second portion of the articulated vehicle. The method further comprises generating a surround view image of the articulated vehicle from the captured image data received from the first and second sets of one or more cameras.

In accordance with another aspect, an apparatus that facilitates generating a composite surround view image using a multi-node computer architecture for an articulated commercial vehicle comprises first receiving means for receiving at a first processing node captured image data of an area surrounding a first portion of the articulated vehicle from a first set of one or more cameras, and second receiving means for receiving at a second processing node captured image data of an area surrounding a second portion of the articulated vehicle from a second set of one or more cameras. The first receiving means is further configured to receive from the second processing node the captured image data of the area surrounding the second portion of the articulated vehicle. The apparatus further comprises processing means for determining an articulation angle between the first and second portions of the articulated vehicle and compensating for the determined articulation angle when generating a surround view image of the articulated vehicle from the captured image data received from the first and second sets of one or more cameras.

One advantage is that a surround view can be generated while preserving flexible coupling of tractors to trailers.

Another advantage is that a need to recalibrate or re-dimension ECUs as different or multiple trailers are used is mitigated Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which facilitate providing multiple electronic control units (ECUs), one on the tractor and another on (each) trailer portion of a multi-segment vehicle, and the respective views generated by cameras associated with each ECU are stitched together to generate a surround view. By "surround view" is meant a full or partial view of the surrounding of the vehicle (e.g., between a 45 degree view and a 360 view, or the like). Each ECU has knowledge of the number and calibration of each camera associated with it. A datalink between the ECUs, using e.g. a compressed data format, enables a surround view to be generated for the driver. Each ECU's capacity may be apportioned for the number of cameras whose images need to be processed.

Trucks often have separable, re-combinable, multiple segments, with a tractor and trailer, or even multiple trailers. Information processing systems for such separable segment vehicles, each segment of which may have its own set of sensors and functions, often create a need for specialized computer architectures. That is, each vehicle segment typically has its own set of sensors, from which information is needed for proper, safe, effective, truck operation. Such sensors may include cameras, speed capturing devices, tire pressure, airflow meters, etc. Because the sensors may each have their own set of characteristics (e.g. field of view and installation parameters for cameras), and because their number and type may vary, the herein-described systems and methods provide an ECU in each vehicle segment to coordinate these signals. Each segment's ECU collects, formats, manages and packages its local information and information flow, including any parameters associated with its segment. The segment ECUs may transmit their information to a master ECU, e.g. located in the tractor, first, front or primary segment of the vehicle. In one embodiment, a backup battery in each segment facilitates each segment operating independently, without an external power source, such as when parked at a freight terminal. The result is a separable, re-combinable, computer architecture for commercial vehicles. In another embodiment, a freight terminal can use the segment sensors without a tractor present, monitoring loading and unloading via cameras, for instance. A suitably equipped external portable computing device, such as a smart phone, can communicate and control a vehicle segment, determining for instance, the tire pressures of the segment.

Figure 1:
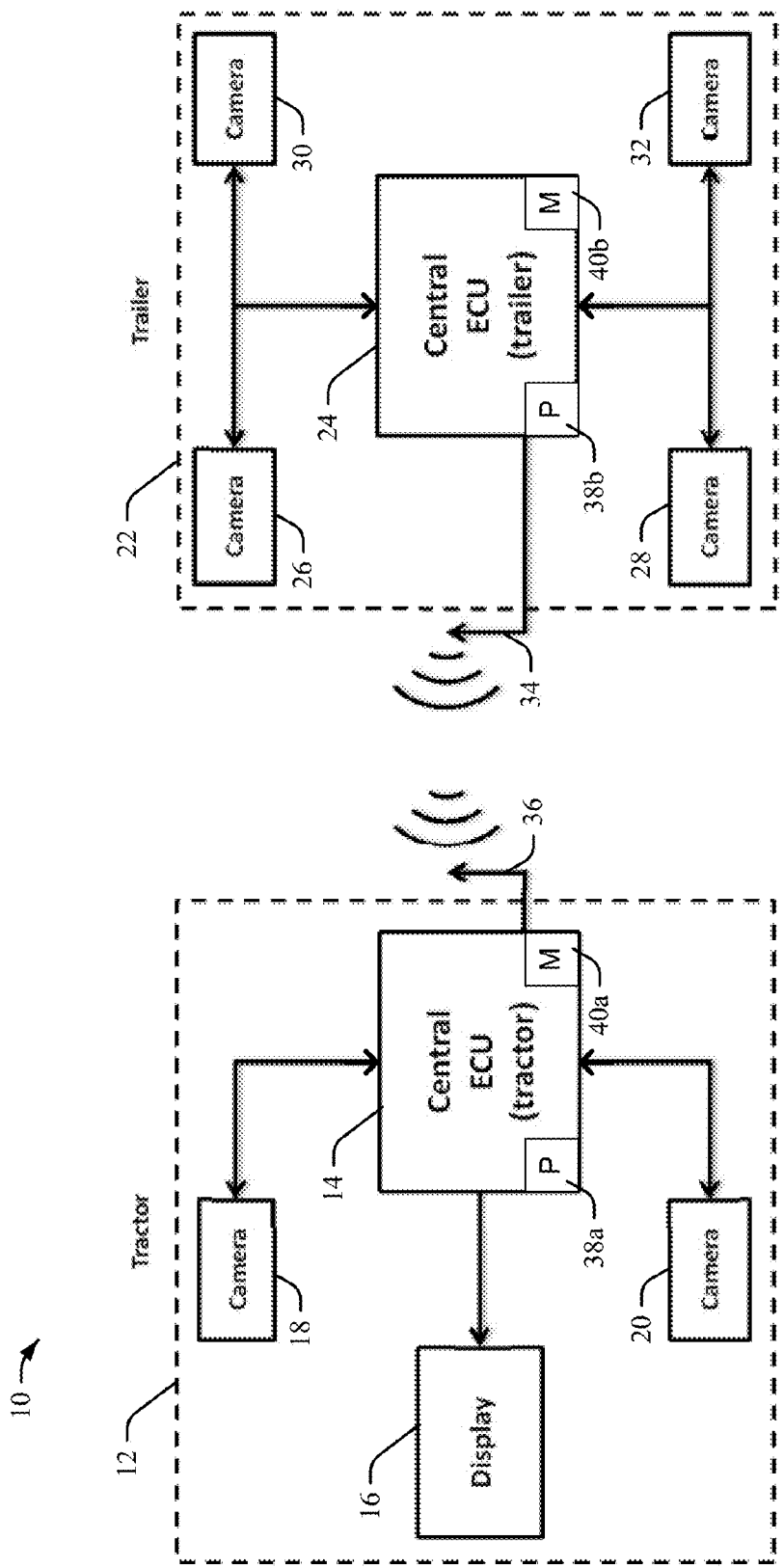
FIG. 1 illustrates a system that facilitates generating a scalable surround view image of a vehicle in accordance with various features described herein.

FIG. 1 illustrates a system 10 that facilitates generating a scalable surround view image of a vehicle in accordance with various features described herein. The system comprises, on a tractor or primary portion 12 of a multi-segment articulated vehicle, a first ECU 14 that is coupled to a display 16 on which a surround view image of the vehicle is displayed and to a plurality of cameras 18, 20 (e.g., wirelessly or by a wired connection). Although two cameras are shown in FIG. 1, it will be appreciated that any number of cameras can be employed to assist in generating a 360° view of the vehicle. Each of the cameras captures images (e.g., video frames) of a portion of the vehicle surroundings, and the first ECU stitches the image frames together to generate a tractor surround view image for output to the display 16.

Similarly, a trailer or secondary portion 22 of the vehicle comprises a second ECU 24 that is coupled (e.g., wirelessly or by a wired connection) to a plurality of cameras 26, 28, 30, 32, and which receives image frames captured by the plurality of cameras. The second ECU comprises an antenna or transceiver 34 via which the second ECU communicates with an antenna or transceiver 36 coupled to the first ECU 14. In one embodiment, the second ECU 24 stitches the images from its plurality of cameras into a partial surround view of the trailer portion of the vehicle and transmits the trailer image data to the first ECU, which then stitches the stitched trailer image data with the previously stitched tractor image data to generate a complete surround view image. As stitching reduces the total amount of pixels (as it rejects those not used in the surround view), data transmission bandwidth is reduced.

Each ECU (e.g., tractor ECU, trailer ECU(s)) has knowledge of the number of cameras and calibration (e.g. optical axis location, focal length, etc.) of each camera associated with it. A datalink between the tractor ECU and trailer ECU enables a complete vehicle surround view to be generated for the driver and/or other viewers. If a trailer ECU fails, the information from the cameras connected to the tractor controller can still provide views of the side of the trailer. In addition, the tractor (first) ECU 14 does not need to be recalibrated when new trailers are added because each trailer portion has its own ECU and associated parameter storage. Each ECU can thus be considered an independent node with knowledge of the other processing nodes (ECUs) around it. The surround view systems are linkable with the tractor and trailers capable of being coupled and uncoupled despite the number of cameras or lack of cameras on each. The driver is provided a consistent surround view of the vehicle regardless of which tractor is connected to which trailer. By providing all the camera information between the tractor and trailer ECUs, a complete surround view of the combined vehicle can be made available to either or both of the tractor and trailer ECUs. In addition, this system is more serviceable as a trailer camera system can be serviced without a corresponding tractor camera system.

Each ECU comprises a respective processor 38a, 38b (collectively, a processor 38) that executes, and a memory 40a, 40b (collectively, a memory 40) that stores, computer-executable instructions (e.g., modules, routines, programs, applications, etc.) for performing the various methods, techniques protocols, etc., described herein. The memory 40 may include volatile memory, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 38. Additionally, "module," as used herein denotes a set of computer-executable instructions (e.g., a routine, sub-routine, program, application, or the like) that is persistently stored on the computer-readable medium or memory for execution by the processor.

Figure 2:
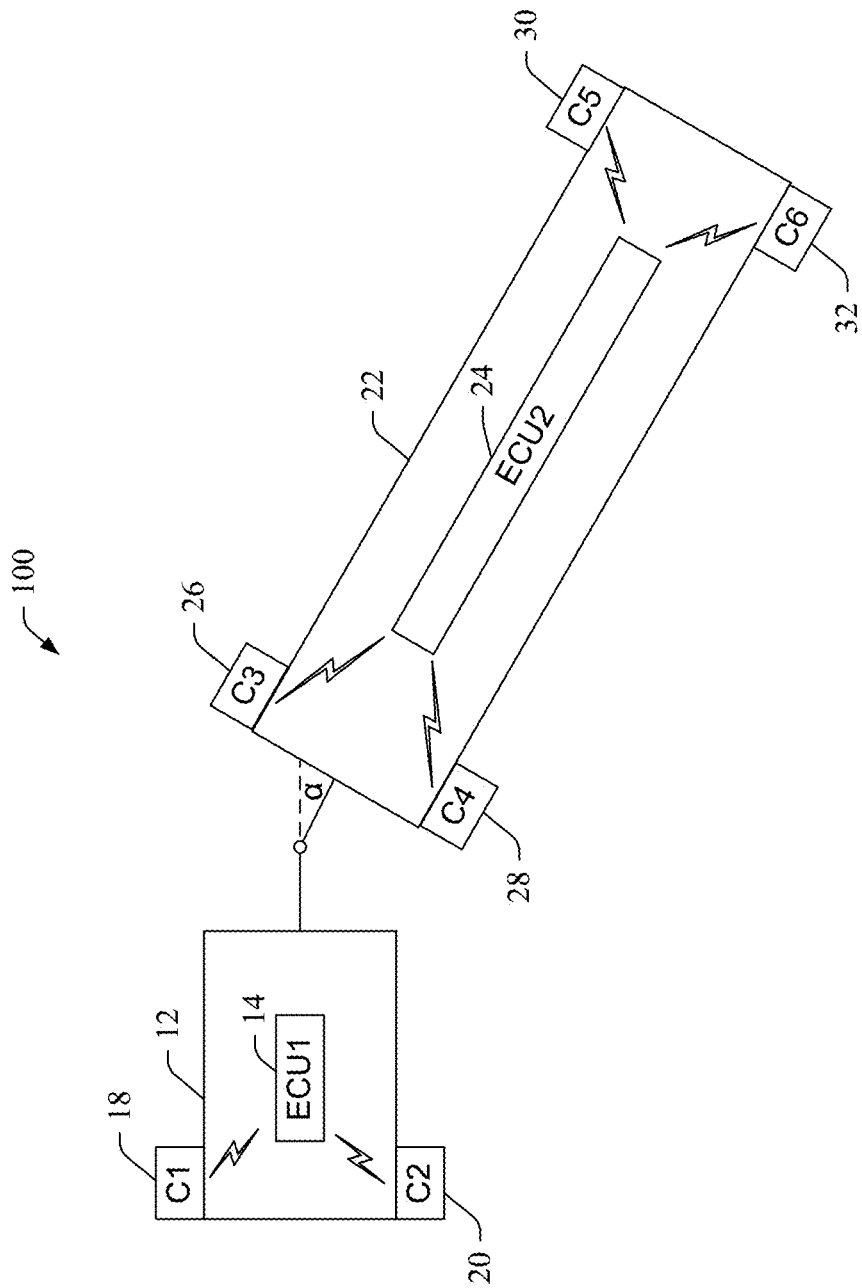
FIG. 2 illustrates a vehicle comprising the tractor portion and the trailer portion, each with its respective ECU.

FIG. 2 illustrates a vehicle 100 comprising the tractor portion 12 and the trailer portion 22, each with its respective ECU 14, 24. The first (tractor) ECU 14 is coupled (e.g., via a wired connection or wireless connection) to each of a passenger side tractor camera (C1) 18 and a driver side tractor camera (C2) 20 mounted on the tractor, although it will be appreciated that the herein disclosed systems and methods are not limited to only two tractor cameras. Each of the cameras 18, 20 captures video image data on its respective side of the tractor 12, and transmits the captured data to the tractor ECU 14, which stitches the camera image data together into a composite tractor surround view image. Similarly, the second (trailer) ECU 14 is coupled (e.g., via a wired connection or wireless connection) to a plurality of cameras including a forward passenger side trailer camera (C3) 26 and a forward driver side trailer camera (C4) 28, as well as a rear passenger side trailer camera (C5) 30 and a rear driver side trailer camera (C6) 32, all of which are mounted to the trailer. It will be appreciated that the herein disclosed systems and methods are not limited to only four trailer cameras or to six total cameras, but rather any desired number of cameras may be couple to the respective ECUs, and any desired number of trailers may be coupled to the vehicle.

The trailer cameras 26, 28, 30, 32 have overlapping fields of view, capture video image data of their respective views of the surroundings of the trailer 22, and transmit the captured data to the trailer ECU 24, which stitches the captured data together into a composite trailer surround view image. In one embodiment, the trailer ECU 24 provides a stitched surround view image of the trailer comprising stitched image data from each of the trailer cameras for each image frame. In another embodiment, the trailer ECU 24 provides the captured image data from each of the trailer cameras directly to the tractor ECU 14 for stitching with the tractor camera image frames.

In yet another embodiment, the trailer cameras are independently powered (e.g., via a wired lead or a battery) and transmit image frame data directly to the tractor ECU for stitching. Additionally or alternatively, the trailer cameras can be configured to periodically receive an acknowledgement message from the trailer ECU when transmitting image data thereto, and upon one or more missing acknowledgement messages, the trailer cameras can transition to transmitting the captured image data directly to the tractor ECU 14.

Articulation angle α between the tractor 12 and trailer 22 is determined by the tractor and/or the trailer ECU (e.g., by analyzing captured image data of the back of the tractor relative to image data of the front of the trailer or by a mechanical sensor at the kingpin), and accounted for by the tractor ECU 14 or ECU 24 when stitching the composite surround view image of the vehicle together in order to provide a seamless bird's eye view for the driver and improve image aesthetic quality.

Figure 3:
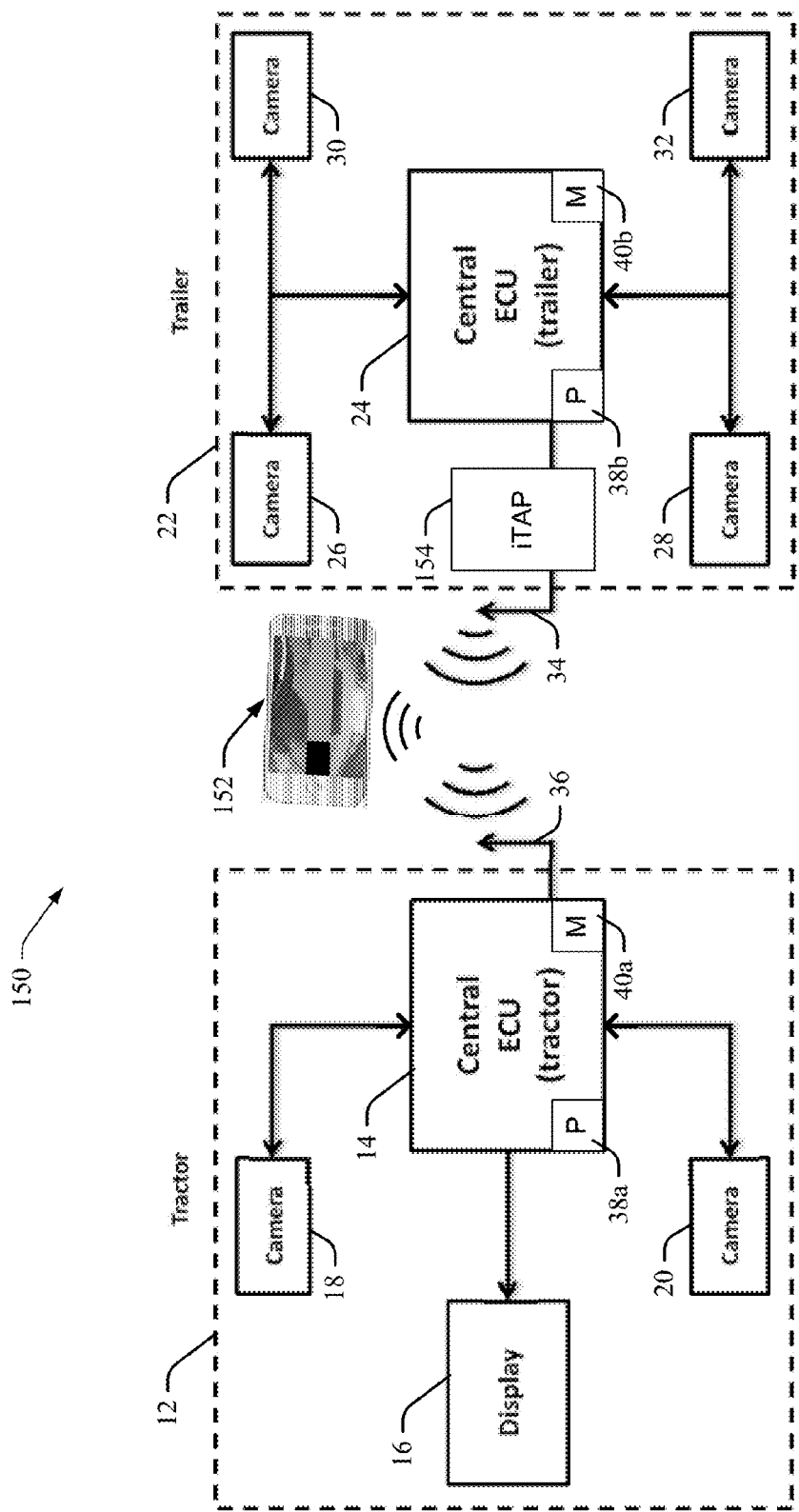
FIG. 3 illustrates a system that facilitates generating a composite surround view of an articulated vehicle using a trailer control application ("app") in accordance with one or more feature disclosed herein.

FIG. 3 illustrates a system 150 that facilitates generating a composite surround view of an articulated vehicle using a trailer control application ("app") in accordance with one or more feature disclosed herein. In one example, the trailer control app is an app such as is manufactured by Knorr-Bremse. Knorr-Bremse's iTAP® trailer remote control uses a portable computing device 152 such as a smartphone or tablet app as to control a wide range of trailer functions as well as clearly display information. The app communicates by WLAN or the like with an iTAP module 154 on the trailer, which passes the control commands via a controller area network (CAN) bus to the brake and chassis control on the vehicle.

In the example of FIG. 3, the system 150 comprises, on the tractor or primary portion 12 of a multi-segment articulated vehicle, the first ECU 14 coupled to the display 16 on which a surround view image of the vehicle is displayed and to the plurality of cameras 18, 20 (e.g., wirelessly or by a wired connection). Although two cameras are shown in FIG. 3, it will be appreciated that any number of cameras can be employed to assist in generating a 360° view of the vehicle. Each of the cameras captures images (e.g., video frames) of a portion of the vehicle surroundings, and the first ECU stitches the image frames together to generate a tractor surround view image for output to the display 16.

Similarly, the trailer or secondary portion 22 of the vehicle comprises the second ECU 24 that is coupled (e.g., wirelessly or by a wired connection) to a plurality of cameras 26, 28, 30, 32, and which receives image frames captured by the plurality of trailer cameras. The second ECU comprises an antenna or transceiver 34 via which the second ECU communicates with an antenna or transceiver 36 coupled to the first ECU 14. Additionally, the ECUs 14, 24 each comprise a respective processor 38a, 38b and memory 40a, 40b as described with regard to FIG. 1.

In one embodiment, the second ECU 24 stitches the images from its plurality of cameras into a partial surround view of the trailer portion of the vehicle and transmits the composite trailer image data to the iTAP module 154, which then forwards the stitched trailer image data to the portable computing device 152 (e.g., a smartphone or tablet device, etc.) for display to the driver. In another embodiment, the tractor (first) ECU also transmits a stitched tractor surround view image to the portable computing device 152, which in turn stitches together the trailer and tractor surround views into a composite surround view of the vehicle. In this example, it is the portable computing device that acts as a master node, as opposed to the first ECU (as is the case in the examples of FIG. 1).

The iTAP module collects data from multiple onboard systems and/or devices. For instance, the iTAP module receives and provides to the portable computing device 152 data associated with, e.g., tire pressure monitor sensors, onboard cameras, load leveling information and electro-pneumatic air suspension information, trailer tilt, roll stability, trailer weight information, finisher brake status information, supply pressure information, and any other suitable auxiliary system information. Additionally, the iTAP module 154 is configured to determine articulation angle of the trailer relative to the tractor, and the articulation angle information is used to adjust the composite image when stitching together the image data to form the composite surround view image of the vehicle. Stitching for articulated vehicles accounts for the rotation between vehicle segments. The partial, stitched camera view of the trailer sent forward to tractor the ECU 14 is rotated and then joined to the partial, stitched view for the tractor. In addition, the stitching line may be adjusted to allow for the changed inter-segment angles. The collected data and articulation angle information can be transmitted by the given segment's ECU continuously with each composite segment image frame or at predetermined intervals.

To couple the iTAP module 154 on a given trailer to the tractor ECU 14 and/or the portable computing device 152, a handshake protocol is used when the trailer is attached to the tractor. For instance, the driver opens the iTAP app on his phone and is prompted to provide a signal through the vehicle to indicate that the phone and/or tractor ECU should be paired with the iTAP module. In one example, the driver is prompted to apply a predetermined amount of force to the trailer brakes. The iTAP module detects the applied brake force and the driver is provided with a graphic on the portable computing device indicating the level of detected brake force. Once the driver applies the predetermined brake force, the iTAP module pairs with the portable computing device and/or the tractor ECU and the system is ready.

With continued reference to FIGS. 1-3, the systems described herein can be viewed as a multi-node computer architecture for commercial vehicles, wherein each vehicle segment has its own dedicated ECU and memory, each ECU being configured to collect, format, manage and package segment information, including image data, sensor information, and control signals, for its segment further use. A master slave relationship can be employed between the multiple nodes in the vehicle (e.g., wherein the tractor ECU is master to the trailer ECU, wherein the portable computing device is master to the trailer ECU and/or the tractor ECU, etc.). The master ECU processor can be associated with driver and/or passenger interface device(s), such as a display(s), keyboard, etc. Additionally, the master node can be configured to control the information flow from and to the slave nodes, with slave information thereby being adjusted, limited, trimmed, or subsampled. In one embodiment, the sensor information may be processed by an ECU on a segment other than the one on which the sensor is installed. Additionally, communication links are provided between the multiple nodes and can employ a common format that can be pre-established or established at the time of segment combination. The communication arrangement can be one of a star, relay, or other geometry for communication.

According to another embodiment example, one or more of the tractor ECU, the trailer ECU, and the iTAP module can determine that a data link between the master node and one or more slave nodes is congested. In such a case, the ECU for the slave node(s) can be instructed to subsample or additionally compress the data it transmits (e.g., image data, sensor data, etc.) so that the data link can handle the transmission. In the case of a WiFi data link having limited bandwidth, image data can be trimmed to remove pixels that do not change over time as the video frames proceed. In another embodiment, the video data is compressed for transmission when the WiFi data link is overburdened. The determination of whether to compress the data, and how much to compress the data can also be made locally by the slave ECU.

Figure 4:
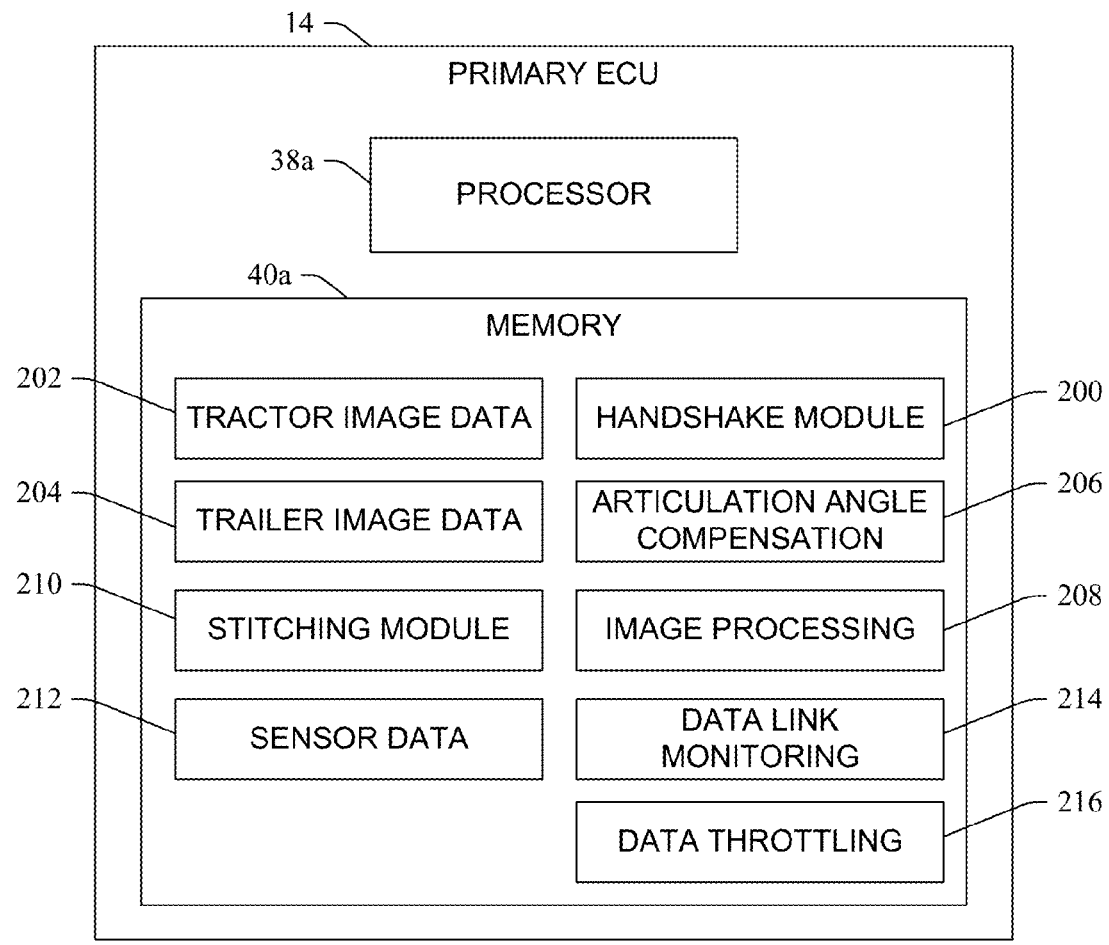
FIG. 4 is an illustration of a primary ECU, in accordance with various features set forth herein.

FIG. 4 is an illustration of a primary ECU 14, such as the tractor ECU or portable computing device described above, in accordance with various features set forth herein. The ECU comprises a processor 38a that executes, and a memory 40a that stores, computer-executable instructions that facilitate performing the various acts, functions, etc., described herein. Upon detecting a trailer ECU or iTAP module within a predetermined range of the primary ECU, the processor executes a handshake module 200 in order to pair with the trailer (secondary) ECU for communication. Once paired, the primary ECU receives tractor image data 202 from a plurality of cameras mounted on the tractor, as well as trailer image data 204 from a plurality of cameras mounted on the trailer(s) to which the tractor is coupled. The processor executes an articulation angle compensation module 206 to determine an articulation angle between the tractor and the trailer, and to compensate for the articulation angle when executing an image processing module 208 to generate a composite image of the vehicle from the tractor image data and the trailer image data. The processor also executes a stitching module 210 that stitches together image frames from the tractor and trailer image data and removes redundant pixels such as occur due to the overlapping fields of view of the pluralities of cameras. In this manner, the processor generates a seamless composite surround view image of the tractor and trailer(s) for each video frame captured by the pluralities of cameras.

In another embodiment, one or both of the ECUs 14, 24, identifies a defective or saturated camera, and refrains from transmitting or using this image data received from the identified camera(s) in order to reduce bandwidth consumption. For instance, if a camera sees nothing when it is blinded (saturated) by light or is defective, the corresponding ECU can send a malfunction indication but refrain from transmitting data captured by the malfunctioning camera.

Additionally, the ECU 14 receives sensor data 212 from one or more sensors located on the tractor and/or trailer. Sensor data can include without limitation tire pressure data, trailer tilt angle, vehicle weight, load balance information, and the like, and can be displayed to a driver along with the composite surround view images. The processor also executes a data link monitoring module 214 that monitors traffic load on the data link between the primary (tractor) ECU 14 and the trailer ECU(s). Upon a determination that the data link is overloaded, the processor executes a data throttling module 216 that instructs the trailer ECU(s) to subsample or additionally compress one or more of the image data and the sensor data being transmitted to the primary ECU over the data link.

It will be appreciated that the herein-described secondary (trailer) processing nodes or ECUs can comprise similar or identical modules, software, instructions, or the like to those of the primary ECU 14 in order to perform the various functions (e.g., image frame stitching, data subsampling, etc.) described herein.

Figure 5:
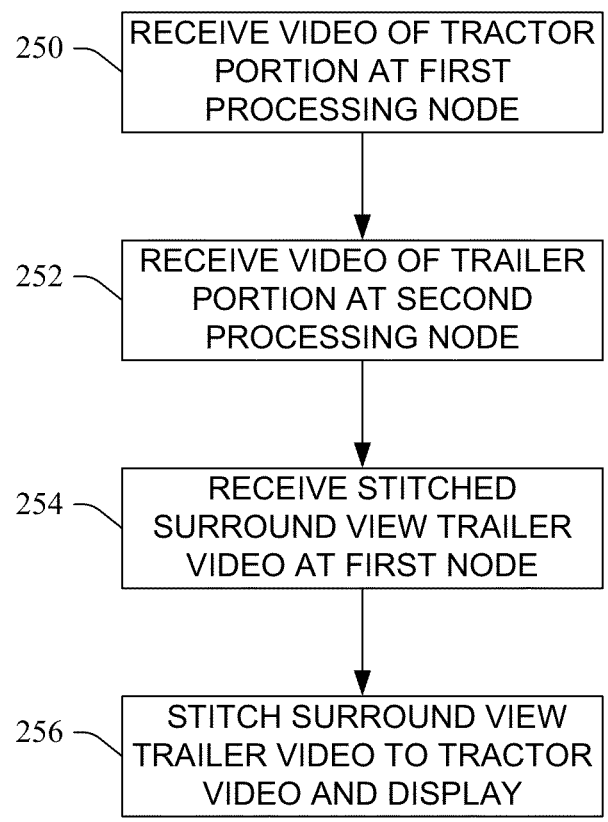
FIG. 5 illustrates a method for generating a composite surround view image using a multi-node computer architecture for an articulated commercial vehicle, in accordance with various features described herein.

FIG. 5 illustrates a method for generating a composite surround view image using a multi-node computer architecture for an articulated commercial vehicle, in accordance with various features described herein. After coupling a tractor and trailer together and pairing their processing nodes via a handshake protocol, at 250 captured image data of an area surrounding a first portion of the articulated vehicle is received at a first processing node (e.g., a tractor ECU) from a first plurality of cameras. At 252, captured image data of an area surrounding a second portion of the articulated vehicle is received at a second processing node from a second plurality of cameras. At 254, the captured image data of the area surrounding the second portion of the articulated vehicle is received at the first processing node either directly from the second plurality of cameras or via the second processing node. In the case where the captured image data from the second plurality of cameras is received via the second processing node, the second processing node first stitches the image data together to generate a surround view of the trailer portion of the vehicle.

At 256, a composite surround view image of the articulated vehicle is generated from the captured image data received from the first and second pluralities of cameras. When generating the composite surround view image, the first processing node can stitch together data captured by individual cameras in the first and second pluralities of cameras, or can stitch together captured data from the first plurality of cameras (mounted to the tractor) into a first surround view image, and stitch the first surround view image together with a second surround view image of the trailer received from the second processing node.

According to another embodiment, a third processing node (e.g., a smart phone or a tablet or the like) receives the first surround view image from the first processing node and the second surround view image from the second processing node, and performs the stitching protocol on the first and second surround view images to generate the composite surround view image of the articulated vehicle for display to a viewer on the smartphone or tablet. The third processing node can be configured to receive the first and second surround view images via an iTAP module associated with the trailer portion of the vehicle, wherein the iTAP module acts as a gateway device between the third processing node and the first processing node.

In another embodiment, the first processing node determines an articulation angle between the tractor portion and the trailer portion of the vehicle and accounts for the determined articulation angle when generating the composite surround view image (e.g., by adjusting pixel data to smooth the image). Additionally, each of the first and second processing nodes can receive sensor data from one or more sensors (e.g., tire pressure monitoring sensor, accelerometers, etc.) associated with their respective vehicle portions.

The sensor data can be presented to the viewer (e.g., a driver) along with the composite surround view images. Moreover, the first processing node can monitor a data link between the first and second processing nodes and can instruct the second processing node to subsample one or both of the sensor data and the image data to reduce traffic on the data link when desired.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates generating a composite image using a multi-node computer architecture for an articulated vehicle, comprising:
 a first set of one or more cameras that capture images of an area surrounding a first portion of the articulated vehicle;
 a first processing node that receives captured image data from the first set of one or more cameras;
 a second set of one or more cameras that capture images of an area surrounding a second portion of the articulated vehicle;
 a second processing node that receives captured image data from the second set of one or more cameras and transmits the captured image data to the first processing node;
 wherein the first processing node is configured to generate a composite surround view image of the articulated vehicle from the captured image data received from the first and second sets of one or more cameras;
 wherein the first processing node identifies one or more cameras in one or more of the first and second sets of one or more cameras is not functioning properly, and omits image data associated with the identified one or more cameras when generating the composite surround view image.

2. The system according to claim 1, wherein the first processing node is configured to generate a first surround view image by stitching together the image data from the first set of one or more cameras, and the second processing node is configured to generate a second surround view image by stitching together the image data from the second set of one or more cameras.

3. The system according to claim 2, further comprising a third processing node that is a portable computing device, which is configured to receive the first surround view image from the first processing node and the second surround view image from the second processing node, and to stitch together the first and second surround view images into a composite surround view image of the articulated vehicle and display the composite surround view image.

4. The system according to claim 3, wherein the second processing node is configured to receive the second surround view images and acts as a gateway device between the first and third processing nodes.

5. The system according to claim 2, wherein the first processing node is configured to receive the second surround view image from the second processing node and to stitch together the first and second surround view images into a composite surround view image of the articulated vehicle.

6. The system according to claim 1, wherein the first processing node is an electronic control unit (ECU) in a tractor portion of the articulated vehicle, and wherein the second processing node is an ECU in a trailer portion of the articulated vehicle.

7. The system according to claim 6, wherein the first processing node determines an articulation angle between the tractor portion and the trailer portion and accounts for the determined articulation angle when generating the composite surround view image.

8. The system according to claim 1, wherein the second processing node is further configured to receive and relay to the first processing node sensor information for one or more monitored parameters of the second portion of articulated vehicle.

9. The system according to claim 8, wherein the first processing node is further configured to detect that a data link between the first and second processing nodes is overloaded, and to instruct the second processing node to reduce data flow of at least one of the image data and the sensor information transmitted over the data link.

10. An electronic controller unit (ECU) that facilitates generating a composite image using a multi-node computer architecture for an articulated vehicle, comprising:
 a processor configured to:
  receive from a first set of one or more cameras captured video data of an area surrounding a first portion of the articulated vehicle;
  receive from a secondary ECU video data captured by a second set of one or more cameras of an area surrounding a second portion of the articulated vehicle;
  determine an angle of articulation between the first and second portions of the articulated vehicle; and
  for each video frame, stitch together a composite surround view image of the articulated vehicle from the captured image data received from the first and second sets of one or more cameras while compensating for the determined articulation angle;
 wherein the processor is further configured to determine that one or more cameras in one or more of the first and second sets of one or more cameras is not functioning properly, and to omit image data associated with the identified one or more cameras when generating the composite surround view image.

11. The ECU according to claim 10, wherein each frame of the video data captured by the second set of one or more cameras is stitched into a surround view of the second portion of the articulated vehicle prior to being received by the processor.

12. The ECU according to claim 11, wherein for each video frame, the processor is further configured to stitch together a surround view image of the first portion of the articulated vehicle and subsequently to stitch together the surround view images of the first and second portions of the articulated vehicle into a composite surround view image of the articulated vehicle.

13. The ECU according to claim 10, wherein the processor is further configured to receive from the secondary ECU current sensor information for one or more monitored parameters of the second portion of the articulated vehicle and to display the received sensor information to a driver with a composite surround view image.

14. The ECU according to claim 10, wherein the processor is further configured to detect that a data link between the ECU and the secondary ECU is overloaded, and to instruct the secondary ECU to reduce the data flow of at least one of the video data and the sensor information transmitted over the data link.

15. A method of generating a composite surround view image using a multi-node computer architecture for an articulated vehicle, comprising:
   receiving at a first processing node captured image data of an area surrounding a first portion of the articulated vehicle from a first set of one or more cameras;
   receiving at a second processing node captured image data of an area surrounding a second portion of the articulated vehicle from a second set of one or more cameras;
   receiving at the first processing node the captured image data of the area surrounding the second portion of the articulated vehicle;
   generating a composite image of the articulated vehicle from the captured image data received from the first and second sets of one or more cameras;
   determining that one or more cameras in one or more of the first and second sets of one or more cameras is not functioning properly;
   omitting image data associated with the identified one or more cameras when generating the composite surround view image.

16. The method according to claim 15, further comprising generating a first surround view image by stitching together the image data from the first set of one or more cameras, and generating a second surround view image by stitching together the image data from the second set of one or more cameras.

17. The method according to claim 16, further comprising receiving at a third processing node the first surround view image from the first processing node and the second surround view image from the second processing node, stitching together the first and second surround view images into a composite surround view image of the articulated vehicle, and displaying the composite surround view image on a display.

18. The method according to claim 17, wherein the second processing node is an gateway device and configured to receive the first and second surround view images and acts as a gateway device between the third processing node and the first processing nodes.

19. The method according to claim 16, wherein the first processing node is configured to receive the second surround view image from the second processing node and to stitch together the first and second surround view images into a composite surround view image of the articulated vehicle.

20. The method according to claim 15, wherein the first processing node is an electronic control unit (ECU) in a tractor portion of the articulated vehicle, and wherein the second processing node is an ECU in a trailer portion of the articulated vehicle.

21. The method according to claim 15 and wherein the first processing node determines an articulation angle between the first portion and the second portion and accounts for the determined articulation angle when generating the composite surround view image.

22. The method according to claim 15, wherein the second processing node is further configured to receive and relay to the first processing node sensor information for one or more monitored parameters of the second portion, and wherein the first processing node is further configured to detect that a data link between the first and second processing nodes is overloaded, and to instruct the second processing node to subsample at least one of the image data and the sensor information transmitted over the data link.

23. An apparatus that facilitates generating a composite image using a multi-node computer architecture for an articulated vehicle, comprising:
   first receiving means for receiving at a first processing node captured image data of an area surrounding a first portion of the articulated vehicle from a first set of one or more cameras;
   second receiving means for receiving at a second processing node captured image data of an area surrounding a second portion of the articulated vehicle from a second set of one or more cameras;
   wherein the first receiving means is further configured to receive from the second processing node the captured image data of the area surrounding the second portion of the articulated vehicle; and
   processing means for determining an articulation angle between the first and second portions of the articulated vehicle and compensating for the determined articulation angle when generating a composite image of the articulated vehicle from the captured image data received from the first and second sets of one or more cameras;
   wherein the processing means is further configured to determine that one or more cameras in one or more of the first and second sets of one or more cameras is not functioning properly, and to omit image data associated with the identified one or more cameras when generating the composite surround view image.

* * * * *